A. M. DEL VALLE.
CENTRIFUGAL CLARIFIER.
APPLICATION FILED AUG. 16, 1919.

1,350,009.

Patented Aug. 17, 1920.
2 SHEETS—SHEET 1.

A. M. DEL VALLE.
CENTRIFUGAL CLARIFIER.
APPLICATION FILED AUG. 16, 1919.

1,350,009.

Patented Aug. 17, 1920.
2 SHEETS—SHEET 2.

UNITED STATES PATENT OFFICE.

ANTONIO M. DEL VALLE, OF NEW YORK, N. Y.

CENTRIFUGAL CLARIFIER.

1,350,009.

Specification of Letters Patent. Patented Aug. 17, 1920.

Application filed August 16, 1919. Serial No. 317,889.

*To all whom it may concern:*

Be it known that I, ANTONIO M. DEL VALLE, a citizen of the United States of America, residing at New York, N. Y., have invented a new and useful Centrifugal Clarifier, of which the following is a specification.

My invention relates particularly to means for separating solids from liquids, as in the clarification of sugar and syrups.

The main object is to provide a simple and inexpensive machine which may be operated economically and at high speed. Another object is to obtain a very high degree of clarification in a single operation. Another object is to remove not only the solid particles, but also any scum which may collect. Another object is to enable the machine to be cleaned out quickly and thoroughly.

In its simplest form the invention contemplates a series of concentric cylindrical pans mounted on a vertical axis and rotated at high velocity. The pans are all open at the bottom and provided with intercommunicating passages. The liquor to be clarified is introduced into the inner cylindrical pan and the heavier particles collect as the lighter particles flow outwardly into the next pan and so on until the substantially clear liquid collects in the outer casing and flows off to a suitable receptacle. The scum is collected by suction from the surface of the liquid in each pan. Nozzles are provided inside of each pan for introducing cleaning and scrubbing fluids such as hot water and steam for removing the sediment in the pans. The pans being open at the bottom and rotated slowly during the cleaning, the sediment is allowed to flow out into a pit receptacle at the bottom from which it may be drained for clarification or other purposes.

Figure 1:
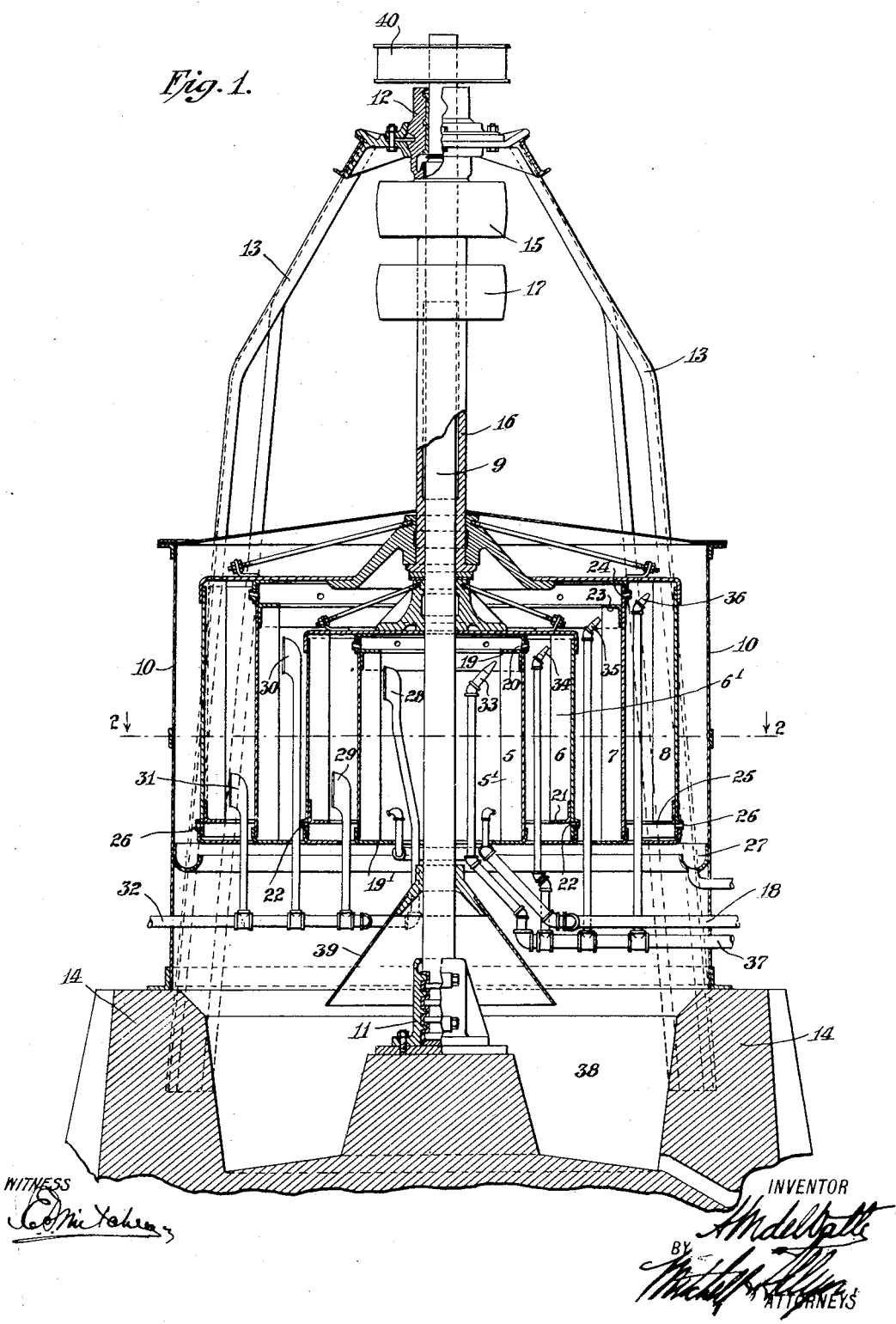
Figure 1, is a vertical sectional view of a machine embodying the improvements of my invention.
Figure 2:
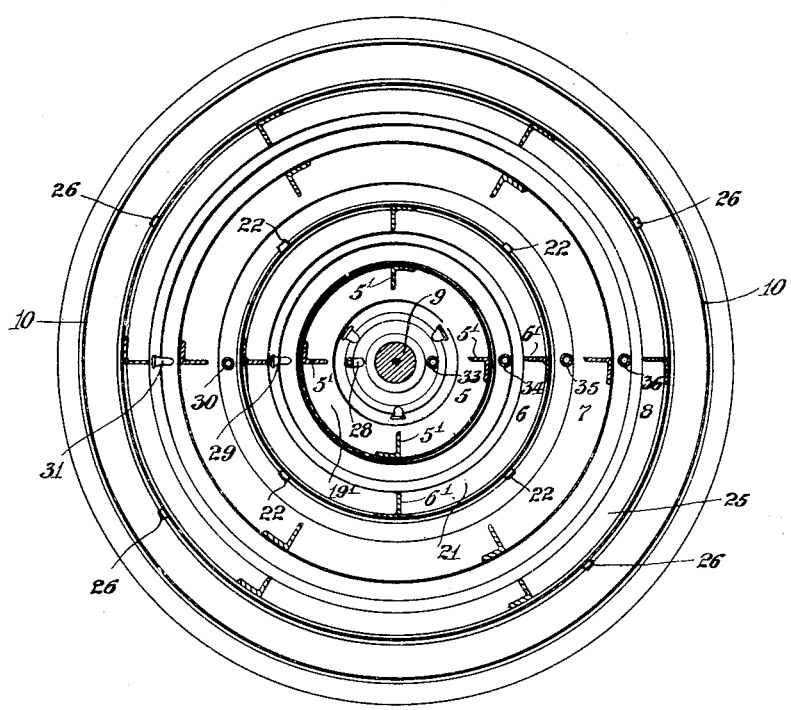
Fig. 2, is a horizontal section on the plane of the line 2—2 of Fig. 1.

The cylindrical pans 5, 6, 7 and 8 are all carried directly or indirectly by the vertical shaft 9 and are rotated inside of the casing 10.

The shaft at the bottom is provided with a suitable stepped bearing 11 and at the top is provided with a suitable bearing sleeve 12 supported by the framework 13.

This framework as well as the casing 10 are supported by a suitable foundation 14 made for instance, of concrete. The shaft 9 carries a pulley 15 by which it is driven. The two inner pans 5 and 6 are connected so as to rotate with the shaft 9. The outer pans 7 and 8 are secured to a sleeve 16 which is rotated on the shaft 9, for instance, by means of a pulley 17.

All the pans are closed at the top but open at the bottom. The liquid to be clarified is introduced through the pipe 18 and distributed through suitable nozzles in the inner pan 5. This pan has a horizontal flange 19 adjacent its upper edge which is shallower than the bottom flange 19' and one or more passages and nozzles 20 is provided adjacent this narrower flange leading into the pan 6. This pan has a flange 21 somewhat shallower than the bottom flange and a passage or passages 22 leading to the pan 7. The latter has a relatively shallow upper flange 23 and a passage or passages 24 leading to pan 8, which in turn has a relatively shallow flange 25 and a passage or passages 26 leading to the outer casing which is stationary and provided with a trough 27 from which the clarified liquid may be drawn off or removed. The flanges on the pans are in effect formed as if a hollow closed cylinder had relatively large apertures in the heads, the edges of the apertures forming the edges of the flanges. The plates 5', 6', etc., assist in keeping the liquid and the precipitate moving with the pans and prevent it from slipping.

In each pan is arranged a skimmer member such as 28, 29, 30 and 31 located in a plane spaced apart but slightly from what may be termed the level of the pan, that is, the liquid, due to centrifugal action, takes a certain level in the pan and the skimmer is arranged slightly spaced from this level so as to remove only scum. These skimmers are all connected to a suction pipe 32.

Inside of each pan is also located a cleaning nozzle or nozzles such as 33, 34, 35 and 36 all connected to a pipe line 37 from which hot water and steam may be introduced. Beneath the separate pans is located a reservoir or pit 38 for collecting the material that flows downward from the pans. A skirt or apron 39 is preferably provided to keep the material from the step bearing 11.

On account of the difference in diameter of the two pairs of pans I prefer to rotate the outer pans at a less angular velocity than the inner pans so as to get more nearly similar mean velocity for the inner and outer pairs of pans. A brake drum 40 may be provided on the shaft for bringing it to rest more quickly when desired.

When the pans are being rotated at high velocity, the liquid to be clarified is forced through the pipe 18 and sprayed from the terminal nozzles into the lower part of the inner pan 5. Centrifugal force throws the liquid and its impurities outwardly against the inner wall of the pan until the pan is full and overflows over the shallow flange 19 into the next pan. Some of the impurities and solid particles remain in the pan 5 but some of them will pass over into the next pan where the same action is repeated and so on out into the casing 10, the liquid becoming all the time clearer and clearer and the solid particles remaining in the pans 5, 6, 7 and 8. During this action scum is likely to rise on the surface of the liquid and is drawn off by the skimmers which are located in each pan adjacent the outlet from that pan to the next pan so as to pick up the scum just before the liquid passes into the next outer pan. The result is that the liquid is repeatedly clarified, the scum being drawn off by suction and the solid or relatively solid particles remaining in the pan.

After the machine has been running for some time, the length of which will depend upon the character of the liquid being treated, the supply is shut off, the machine slowed down and hot water and steam are sprayed into the pans through the nozzles 33, 34, 35 and 36 so as to clean out the pans thoroughly, the material running down into the pit 38. On account of the construction and arrangement of the parts this cleaning operation need only take a few minutes, after which the machine is ready to start up and recommence its clarifying operation.

I claim:—

1. In a clarifying machine, a plurality of concentrically arranged cylindrical pans rotatably mounted on a cylindrical axis, each of the inner pans having a relatively shallow flange at one edge and a passage leading to the next outer pan and the outer pan having a passage leading outwardly and means for collecting the clarified liquid.

2. In a clarifying machine, a plurality of concentrically arranged cylindrical pans rotatably mounted on a cylindrical axis, each of the inner pans having a relatively shallow flange at one edge and a passage leading to the next outer pan and the outer pan having a passage leading outwardly, means for collecting the clarified liquid and a skimmer arranged in each pan for removing the scum.

3. In a clarifying machine, a plurality of concentrically arranged cylindrical pans rotatably mounted on a cylindrical axis, each of the inner pans having a relatively shallow flange at one edge and a passage leading to the next outer pan and the outer pan having a passage leading outwardly, means for collecting the clarified liquid, a skimmer arranged in each pan for removing the scum and means for introducing a cleaning fluid into each pan.

4. In a clarifying machine, a plurality of concentrically arranged pans, means for rotating said pans at high velocity, means for introducing a liquid into the inner pan, means for collecting the clarified liquid outside of the outer pan and suction means for removing the scum from each pan.

5. In a clarifying machine, a plurality of concentrically arranged cylindrical pans, means of communication between said pans, means for introducing liquid into the inner pan, means for collecting the clarified liquid from the outer pan and means for removing the scum from the liquid in each pan.

6. In a clarifying machine, a plurality of concentrically arranged cylindrical pans, means of communication between said pans, means for introducing liquid into the inner pan, means for collecting the clarified liquid from the outer pan and means for introducing a cleaning fluid into each pan.

7. In a clarifying machine, a plurality of concentrically arranged pans having relatively shallow inturned flanges at one end, a shaft supporting said pans, means of communication between said pans, a collecting receptacle beneath said pans and an apron surrounding the lower end of said shaft.

ANTONIO M. del VALLE.